Patented June 30, 1925.

1,544,433

UNITED STATES PATENT OFFICE.

HAROLD T. COSS, OF LOMPOC, CALIFORNIA, ASSIGNOR TO THE CELITE COMPANY, OF LOS ANGELES, CALIFORNIA, A CORPORATION OF DELAWARE.

SEMIREFRACTORY HEAT-INSULATING COMPOSITION, PRODUCTS AND PROCESSES OF MAKING THE SAME.

No Drawing. Application filed July 16, 1924. Serial No. 726,349.

*To all whom it may concern:*

Be it known that I, HAROLD T. COSS, a citizen of the United States, residing at Lompoc, in the county of Santa Barbara and State of California, have invented a new and Improved Semirefractory Heat-Insulating Composition, Products and Processes of Making the Same, of which the following is a specification.

This invention relates to a composition of matter which when moulded or fabricated into any desired shape and then burned in a suitable furnace or kiln, produces fabricated shapes of great strength, high resistance to temperature changes, light weight and very low thermal conductivity at temperatures above 1000° C. as well as at low temperatures.

The predominant object of this invention is the formation of a semi-refractory thermal insulator, (using some form of diatomaceous earth as the basis) which will not spall or disintegrate when exposed to rapid temperature changes, and will not be subject to the larger volumetric expansions of the commoner forms of silica due to inversion thereof. In making my semi-refractory heat insulation brick or other ceramic body, I use diatomaceous earth, a refractory binder of clay-like composition, such as feldspar, and lime. A grog of calcined material, and a small amount of plastic clay may be used if conditions require it.

The ceramic bodies produced in accordance with my invention are particularly adaptable to the thermal insulation of high temperature equipment such as electric furnaces, cement kilns, boilers operating at high rating and all other forms of equipment from which heat is being dissipated and lost. Intermittent operation of furnaces or other equipment insulated with brick made in accordance with my invention, does not cause disintegration of these brick due to rapid temperature changes, as most of the silica present is in the form of tridymite, which is stable, and the porous structure of the brick absorbs the volumetric changes which occur so that a substantially constant volume is maintained.

Silica in various forms has been used for many years as an ingredient in fabricated ceramic bodies such as brick. Lime, raw or calcined clays and various organic fillers have also been used in manufacturing brick, but the products have been generally of high density. For building or refractory construction purposes, high density is not objectionable, but since a dense product most usually has a high thermal conductivity, these brick have not been used as ins ors. Diatomaceous earth (kieselguhr) has used in natural form, as it is an excellent nonconductor of heat, and has a difficultly alterable physical and chemical composition, amorphous silica being the predominating constituent. Diatomaceous earth has also been used in ceramic bodies and insulating brick, but the greatest difficulty encountered has been the reversible volumetric expansion of the silica and the fact that whenever a binder had been introduced to give a reasonable amount of strength, the termal conductivity of the product was increased to such a degree that its value as an insulator was not sufficient for industrial work.

It is well known that porous materials are good insulators and the use of organic matter in moulded products and then burning out of such matter to form voids, has been disclosed. These pores are relatively large, however and at high temperatures conduct comparatively much greater amounts of heat than pores of microscopic size. For this reason I utilize the pores of diatomaceous earth and their mechanical structure, but change the physical or chemical character of the silica.

In operating my invention I follow the general line of silica brick manufacture as regards fabricating, drying and firing. The pressure used in fabricating, the proportions of materials used, the length of time of firing and the product, are quite different. The water content of my moulded brick varies from 100 to 180 per cent, while in silica brick manufacture it is never over 20 per cent. While silica brick are made under high pressure, my brick may be made under a low pressure. While it is necessary in the manufacture of silica brick to fire them to 1370° C.–1500° C. for several days, I may fire my brick at the temperature at which standard cones 12 or 13 soften (1370 to 1390° C.), for relatively short periods and produce the same or a greater amount of inversion to tridymite.

I have obtained very good results in making semi-refractory insulating brick with from 80 to 94 per cent diatomaceous earth, about 1 to 3 per cent lime, about 2 to 7 per cent of clay or feldspar, and up to 12 per cent grog. This grog, or aggregate, usually composed of particles of culled brick obtained from my process, or of crushed diatomaceous earth, may be eliminated, if desired, as it decreases the burned strength, although it regulates the shrinkage to some extent. The clay, or feldspar, referred to above, is used as a bond and for this purpose any refractory or semi-refractory with a long vitrifying range, is preferable. Ball clay, feldspar, china clay or even diatomaceous earth with a large amount of clay impurity, notably alumina, may be used. When impure or clay-containing diatomaceous earth is used as a binding material, a sufficient amount is added to introduce from about 2% to 7% of clay. I have found that a very satisfactory product may be made by using 93 per cent of diatomaceous earth, 2 per cent quicklime and 5 per cent feldspar, although a ceramic body made of 81.5 per cent diatomaceous earth, 2.5 quicklime, 7 per cent clay and 9 per cent grog, also gives good results.

As an illustration, in carrying out my invention for the manufacture of brick of this composition, the ingredients mentioned above are thoroughly mixed in a pug mill or interground in a wet pan or mixed or interground in any other suitable machine designed for the purpose, with from 1.2 to 1.8 parts of water, by weight, and then pressed or moulded into the shape desired. Hand moulding gives very good results, but there are several types of brick presses on the market which can also be used to great advantage. The pressed or moulded shapes are then dried, either in the air or in a suitable drier and then burned in a furnace or suitable brick kiln to a temperature at which the required amount of silica inversion takes place, say from 1250°–1500° C., depending upon the mix used and purpose to which final product will be applied, the maximum temperature of firing being maintained for approximately two days, more or less. Brick made as above described are very light and strong and possess high heat insulating value, as well as refractoriness, a combination not hitherto achieved in the art.

In making brick I prefer to use approximately 93 per cent disintegrated diatomaceous earth, 2 per cent quicklime and 5 per cent feldspar or clay, by weight, thoroughly mixed with 1.7–1.8 parts of water, which slakes the lime and gives a workable mass. One feldspar which I have used contained approximately 70 per cent silica and 10 per cent potash, (as $K_2O$). The temperature was raised at the rate of about 23° C. per hour until cone 12 (1371° C.) was down. After firing to cone 12, the resulting brick weighed 570 kg. per cubic meter and had a modulus of rupture of 11.1 kg. per sq. centimeter. The silica brick now on the market have a density of over 2000 kg. per cubic meter, so that my product is approximately one quarter the density of the standard product.

Ordinary quartz, such as is used in the manufacture of so called silica brick, inverts to cristobalite and upon long continued heating, to tridymite. This inversion is slow and influences the entire granules of which the brick are composed, so that a relatively compact dense product is obtained, which is not only a better heat conductor than clay firebrick, but one which is very susceptible to disruptive volume expansions at the low temperature silica inversions. Diatomaceous earth is composed of amorphous silica which inverts to cristobalite and then to tridymite, but much more rapidly and more completely. Due to the fine state of division of diatomaceous earth and the microscopic size of the individual diatoms, this change is largely submicroscopic in size and does not alter the outward appearance of the diatoms. Although the change is apparently sub-microscopic, I do not wish to limit myself to any particular theory as to what takes place during the above described operation. The highly porous character of the diatomaceous earth brick tends to absorb what volume changes occur and minimizes the danger of spalling or cracking, which are the result of these disruptive forces. The various forms of silica differ in specific gravity as follows:

| | Sp. gr. | |
|---|---|---|
| Quartz | 2.65 | (Smithsonian Physical Tables 1921, Table 97). |
| Crystobalite | 2.315 | (Smithsonian Physical Tables 1921, Table 99). |
| Tridymite | 2.27 | (Moore & Taylor, Bulletin M–3, 1924, Topographical and Geological Survey of Pa.). |
| Diatomaceous earth opal (kieselguhr) | 1.9–2.2 | (Smithsonian Physical Tables 1921, Table 97 Dana "System of Mineralogy," 6th edition, pages 194Fs). |

It will, therefore, be seen that the inversion of quartz into cristobalite or tridymite as in the usual process of silica brick manufacture results in a product having a lower specific gravity than the raw material used, while in my process the diatomaceous silica is inverted into either cristobalite or tridymite with a resulting increase in specific gravity.

Not until temperature conditions of over 1370° C. are reached, does change in silica structure of diatomaceous earth become apparent under the microscope. Under such conditions part of the skeleton structure is replaced by very minute cristobalite and tridymite crystals which still leave a microscopically porous heat insulating material. As tridymite is the most stable form of silica, it is desirable to change as much of the diatomaceous earth silica to this form as quickly as possible and for this purpose I have found quicklime to be a very effective catalyst.

I have found that the use of small quantities of lime accelerates inversion of the diatomaceous silica and increases the porosity of the brick. The reason for this last action is not clear at present, but numerous experiments have shown that the brick made with the lime are lighter and more porous than without the lime. It is known that lime in clay increases the porosity of a clay body during burning and prevents vitrification until the extreme condition of melting of the clay occurs. The lime reduces the melting temperature of the clay somewhat, but until this condition is reached, it prevents a shrinkage and vitrification. The semi-colloidal nature of the clay and the very fine character of diatomaceous earth as compared to the granular character of quartzites may be a clue to this peculiar behavior.

In this way the lime used by me fulfills an entirely different function from its use in the manufacture of silica brick, where it is used as a bond and forms a calcium silicate which gives the brick great strength. In my composition, the addition of lime gives a slightly weaker brick, but it is necessary in order to accelerate the inversion. I supply a bond in the form of ball clay, feldspar, china clay or other fragmentary material of clay-like composition.

I have also found that in some cases the use of gypsum or calcium sulphate in place of, or in addition to, quicklime, gives very good results. The gypsum, by virtue of its lime content, acts as an inversion agent in facilitating the change of the silica to the tridymite form. It also prevents vitrification of the clay or feldspar and increases the strength of the product at high temperatures. Other calcium compounds may also be used, and when used in place of lime, the gypsum or other calcium compound may be added in proportions corresponding substantially to those given above for lime.

Whenever I have referred to the use of diatomaceous earth in these specifications I wish to cover the material known also as kieselguhr, infusorial earth, tripoli or fossil flour, either in the natural state or dried or calcined with or without chemicals before or after disintegration. The preferable form of diatomaceous earth to use in my process and composition is the natural, uncalcined form.

My composition may be mixed with a sufficient amount of water to give a mouldable paste and then placed and burned "in situ" but in usual operation brick, blocks, tile and various other shapes may be fabricated by moulding, then dried and burned. Brick have been frequently mentioned in the specifications but I do not wish to be limited to the use of the disclosed composition or process for the manufacture of brick alone, as tiles, special shapes, blocks, etc., may also be made.

My invention therefore comprises the use of diatomaceous earth, lime as a catalyst for the silica inversion and a retardant of vitrification, a refractory or semi-refractory material of clay-like composition and preferably of a long vitrifying range as a bond, and the use of a grog or aggregate to regulate shrinkage, the resulting product being of a higher specific gravity than the silica of the diatomaceous earth, and containing a large percentage of tridymite and still retaining a very porous structure. While I have mentioned certain preferred proportions of the various ingredients, it will be understood that proportions somewhat outside the limits above mentioned may in some cases be used with more or less success and without departing from the spirit of my invention.

What I claim is:

1. A refractory heat insulating material consisting principally of silica in the form of tridymite, produced by calcining fabricated bodies made of a mixture of diatomaceous earth, a catalytic inversion agent and water.

2. A refractory heat insulating material consisting principally of silica in the form of tridymite produced by calcining a mixture of diatomaceous earth, a catalytic inversion agent, a clay-like binder and water.

3. A refractory heat insulating material consisting principally of silica in the form of tridymite produced by calcining fabricated bodies made of a mixture of diatomaceous earth, lime and water.

4. A refractory heat insulating material consisting principally of silica in the form of tridymite produced by calcining a mixture of diatomaceous earth, lime, a clay-like binder and water.

5. A process for manufacturing refractory insulating bodies comprising mixing diatomaceous earth, lime and water, fabricating into suitable shapes and then drying and burning such shapes.

6. A process of manufacturing refractory insulating bodies comprising mixing diatomaceous earth, lime, a clay-like binder and water, fabricating into suitable shapes and then drying and burning such shapes.

7. A process for manufacturing refractory insulating bodies comprising intergrinding diatomaceous earth, lime, a refractory binder of clay-like composition and water, fabricating into suitable shapes and then drying and burning such shapes.

8. A new article of manufacture consisting of a refractory insulating body made by calcining a fabricated shape comprising diatomaceous earth, lime, a refractory binder of clay-like composition, and water.

9. A new article of manufacture consisting of a refractory insulating body made by calcining a fabricated shape comprising diatomaceous earth, lime, a binder, a clay-like grog, and water.

10. A new article of manufacture consisting of a refractory insulating body made by calcining to or below 1500° C. a fabricated shape comprising about 82 per cent diatomaceous earth, 2 per cent lime, 7 per cent clay, 9 per cent grog, by weight, and water.

11. A refractory heat insulating material produced by calcining a mixture of diatomaceous earth, a calcium compound, a clay-like binder, and water.

12. The process of manufacturing refractory insulating bodies comprising mixing diatomaceous earth, a calcium compound and water, fabricating into suitable shapes, and then drying and burning such shapes.

13. A refractory heat insulating body comprising porous silica substantially in the form of tridymite produced by calcining diatomaceous earth in the presence of a catalytic inversion agent.

14. A heat insulating material produced by mixing diatomaceous earth, a catalytic inversion agent, and water, fabricating into suitable shapes, drying such shapes and calcining them at a temperature sufficient to invert substantially all the silica of the diatomaceous earth to the form of tridymite.

15. A heat insulating material produced by mixing diatomaceous earth, a catalytic inversion agent, a clay-like binder, and water, fabricating into suitable shapes, drying such shapes and calcining them at a temperature sufficient to invert a substantial part of the silica of the diatomaceous earth to the form of tridymite.

16. A process of manufacturing refractory insulating bodies comprising mixing diatomaceous earth, a catalytic inversion agent, a refractory binder of clay-like composition, and water, fabricating into suitable shapes and then drying and burning such shapes to a temperature sufficient to form tridymite from silica present in the diatomaceous earth.

17. The herein described process of manufacturing refractory insulating bodies, which consists in forming a moulded body of a mixture of diatomaceous earth containing silica having a lower specific gravity than tridymite, lime and a clay-like binder, and then burning such body to invert the said silica therein to the form of tridymite.

18. A process of manufacturing refractory insulating bodies of higher specific gravity than the raw material, comprising mixing diatomaceous earth, lime and a clay-like binder, fabricating into suitable shapes and then drying and burning such shapes.

19. A new article of manufacture consisting of a refractory insulating body of higher specific gravity than diatomaceous silica made by calcining a fabricated body comprising diatomaceous earth, lime and a clay-like binder.

In testimony whereof I have hereunto subscribed my name this 27th day of June, 1924.

HAROLD T. COSS.